US008128486B2

(12) United States Patent
Thomas

(10) Patent No.: US 8,128,486 B2
(45) Date of Patent: Mar. 6, 2012

(54) WAGERING GAME WITH WAGER MANIPULATION

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1355 days.

(21) Appl. No.: 11/572,314

(22) PCT Filed: Jul. 18, 2005

(86) PCT No.: PCT/US2005/025612

§ 371 (c)(1), (2), (4) Date: Jan. 18, 2007

(87) PCT Pub. No.: WO2006/014657

PCT Pub. Date: Feb. 9, 2006

(65) Prior Publication Data

US 2007/0184891 A1 Aug. 9, 2007

Related U.S. Application Data

(60) Provisional application No. 60/590,394, filed on Jul. 21, 2004.

(51) Int. Cl.
*A63F 13/00* (2006.01)
*A63F 9/24* (2006.01)

(52) U.S. Cl. ................ 463/25; 264/16; 264/20; 264/29; 264/42

(58) Field of Classification Search .................... 463/16, 463/20, 25, 29, 40–42; 273/138.1–2, 143 R
See application file for complete search history.

(56) References Cited

U.S. PATENT DOCUMENTS

| | | | | |
|---|---|---|---|---|
| 6,244,958 | B1 | 6/2001 | Acres | 463/26 |
| 6,312,334 | B1 * | 11/2001 | Yoseloff | 463/25 |
| 6,431,983 | B2 | 8/2002 | Acres | 463/25 |
| 6,800,030 | B2 | 10/2004 | Acres | 463/25 |
| 7,063,617 | B2 | 6/2006 | Brosnan et al. | 463/25 |
| 7,318,775 | B2 | 1/2008 | Brosnan et al. | 463/25 |
| 7,572,183 | B2 * | 8/2009 | Olivas et al. | 463/25 |
| 2002/0025848 | A1 * | 2/2002 | Graham et al. | 463/25 |

* cited by examiner

*Primary Examiner* — Dmitry Suhol
*Assistant Examiner* — Ryan Hsu
(74) *Attorney, Agent, or Firm* — Nixon Peabody LLP

(57) ABSTRACT

Wagering game terminal and method of operating same are disclosed that increases the excitement and entertainment value over existing gaming terminals. The wagering game terminal manipulates the player's wagers instead of his winnings so that any winning outcome resulting from the wagers is increased. This allows the player to feel as if he has already won "free money" before the game has even started. Such an arrangement may increase the overall excitement felt by the player and may encourage the player to wager more. And since only some wagers will result in a winning outcome, it is possible to perform the wager increases without significantly changing the underlying mathematics of the game.

3 Claims, 5 Drawing Sheets

WAGERING GAME WITH WAGER MANIPULATION

CROSS-REFERENCE TO RELATED APPLICATIONS

This application is a U.S. National Phase of International Application No. PCT/US2005/025612, filed Jul. 18, 2005, which claims the benefit of priority from U.S. Provisional Application No. 60/590,394, filed Jul. 21, 2004, both of which are incorporated by reference in their entirety.

FIELD OF THE INVENTION

The present invention relates generally to wagering games and, more particularly, to a wagering game terminal and method of operating same where contributions are made to a player's wagers.

BACKGROUND OF THE INVENTION

Wagering game terminals, such as slot machines, video poker machines, and the like, have been a cornerstone of the gaming industry for several years. The popularity of such wagering game terminals among players generally depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are likely to be attracted to the more entertaining and exciting of the terminals.

Consequently, wagering game terminal operators strive to employ the most entertaining and exciting terminals available because such terminals attract frequent play and, hence, increase profitability for the operators. Thus, in the highly competitive wagering game terminal industry, there is a continuing need to develop new types of games, or improvements to existing games, that will enhance the entertainment value and excitement associated with the games.

One concept that has been successfully employed in existing wagering game terminals to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum play the gaming machine without winning the jackpot. Further, when several gaming machines are linked together such that several players at several gaming machines compete for the same jackpot, the jackpot progressively increases at a much faster rate, which leads to further player excitement.

Another concept that has been employed is that of a secondary or "bonus" game which may be played in conjunction with a "basic" game. The bonus game may include any type of game, either similar to or entirely different from the basic game, and is typically initiated by the occurrence of certain pre-selected events or outcomes of the basic game. Examples of the types of bonus games may include adventure games, guessing games, games of chance, and the like. Such a bonus game has been found to produce a significantly higher level of player excitement than the basic game alone because it provides an additional chance to play, which increases the player's overall expectation of winning.

Yet another concept that is sometimes employed in both the bonus game and the basic game is to randomly manipulate the amount of money/credits won. For example, the winning outcome may sometimes include a feature that automatically increases the player's winnings. A "Double" symbol in the payline of a slot machine that doubles the amount won is an example of such a feature. This type of scheme is designed to enhance the excitement that the player feels by conveying the perception that they are getting "free money." In current gaming terminals, however, only the amount that is actually won is manipulated. As a result, the players have to wait until the end of the game to know whether they have won any "free money." Moreover, because a winning outcome that also includes the "Double" symbol occurs less frequently than regular winning outcomes, the perception of receiving "free money" is somewhat lessened.

Therefore, there is a need for wagering game terminals that are capable of providing increased excitement and entertainment value over existing wagering game terminals. More specifically, what is needed is a wagering game terminal that manipulates the amounts wagered instead of the amounts won, thus giving players the perception that they have won "free money" even before the game has started.

SUMMARY OF THE INVENTION

The present invention is directed to a wagering game terminal and method for operating same that increases the excitement and entertainment value over existing gaming terminals. The wagering game terminal manipulates the player's wagers instead of his winnings so that any winning outcome resulting from the wagers is increased without increasing the amount at stake for the player. This allows the player to feel as if he has already won "free money" before the game has even started. Such an arrangement may increase the overall excitement felt by the player and may encourage the player to wager more. And since only some wagers will result in a winning outcome, it is possible to perform the wager increases without significantly changing the underlying mathematics of the game.

In general, in one aspect, the invention is directed to a wagering game terminal. The wagering game terminal comprises a wager input for accepting a wager for a wagering game from a player at the wagering game terminal and a display for displaying an outcome of the wagering game, the outcome randomly selected from a plurality of outcomes. The wagering game terminal is configured to increase the wager for the wagering game without increasing an amount at risk for the player.

In general, in another aspect, the invention directed to a method of operating a wagering game terminal. The method comprises the steps of accepting a wager for a wagering game from a player at the wagering game terminal and displaying an outcome of the wagering game, the outcome randomly selected from a plurality of outcomes. In accordance with embodiments of the invention, the method further comprises the step of increasing the wager for the wagering game by a predetermined amount, the predetermined amount funded by the wagering game terminal.

In general, and still another aspect, the invention is directed to a wagering game system. The wagering game system comprises a network and a plurality of wagering game terminals connected to the network, the wagering game terminals providing wagering games thereon in which an outcome is randomly selected from a plurality of outcomes in response to receiving wagers from players at the wagering game terminals. In accordance with embodiments of the invention, the wagering game terminals are configured to increase a wager for the wagering game without increasing an amount at risk for players of the wagering game terminals.

In general, in yet another aspect, the invention is directed to a method of manipulating wagers in a wagering game terminal. The method comprises the steps of accepting a wager for a wagering game from a player at the wagering game terminal and siphoning a portion of the wager and contributing the portion to a pool of funds. The method further comprises the step of increasing the wager, the increased wager funded by the wagering game terminal from the pool of funds. The wagering game is then conducted, including randomly selecting an outcome from a plurality of outcomes, the plurality of outcomes including at least one winning outcome. The player is thereafter awarded an award commensurate with the increased wager if the randomly selected outcome is the at least one winning outcome.

The above summary of the present invention is not intended to represent each embodiment or every aspect of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
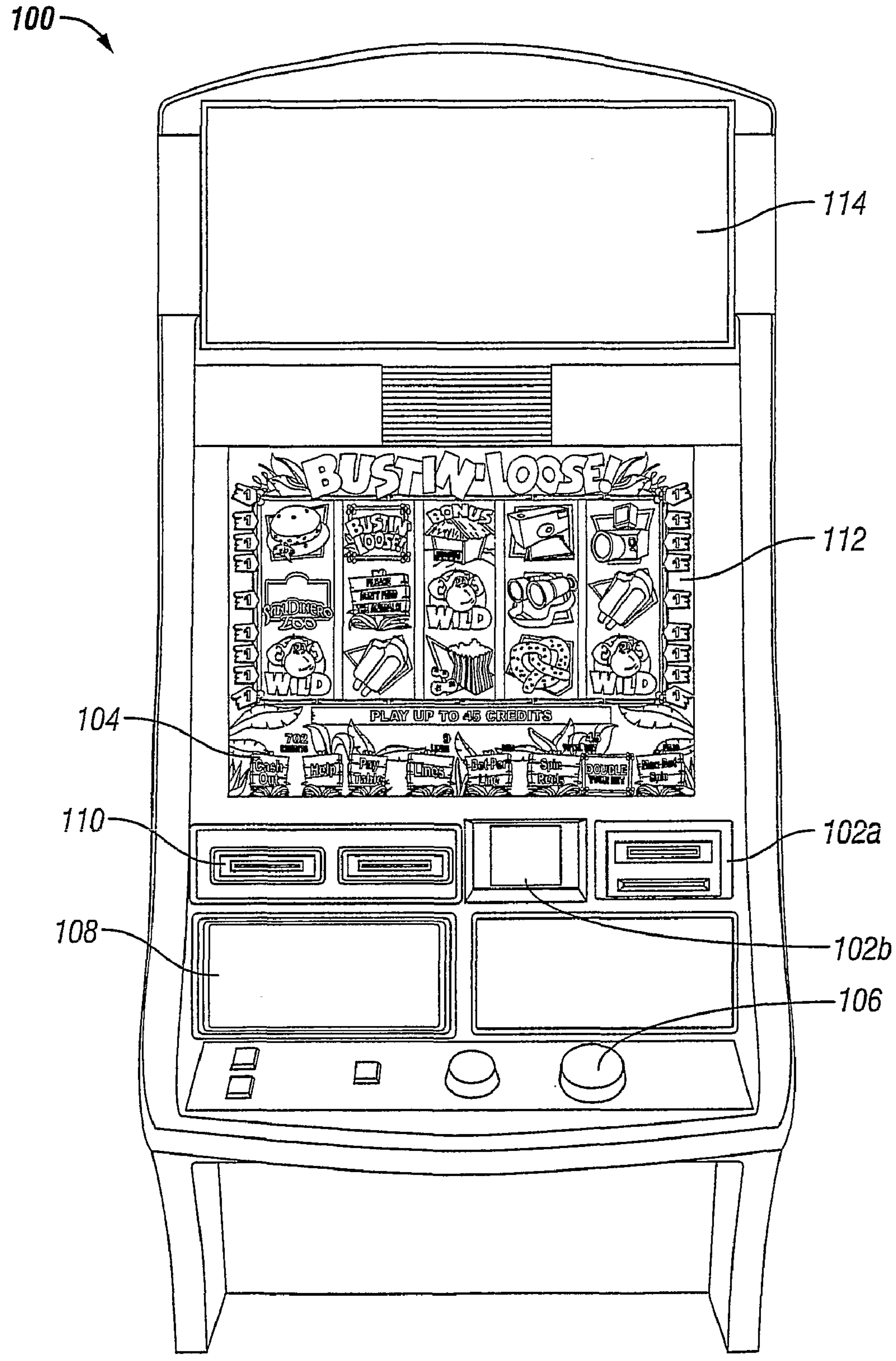
FIG. 1 illustrates a wagering game terminal according to one embodiment of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As mentioned above, embodiments of the invention provide a wagering game terminal and method for operating same where the player's wagers instead of his winnings are manipulated (e.g., doubled). Payouts in wagering game are generally proportional to the player's wager. For example, in a multi-coin, multi-line slot machine, the payout for a winning combination along a particular payline is multiplied by the line bet (i.e., amount wagered on the winning line). Thus, increasing the player's wager effectively increases the possible payouts. It has been observed, however, that players are generally reluctant to wager more than the minimum amount required to play a given wagering game terminal. Therefore, a wagering game that increases the player's wagers without increasing his amounts at risk (i.e., wager manipulation), would be highly desirable. The player would feel as if he has already won "free money" before the game has even started.

The term "free money" as used herein refers to money/credits above and beyond any amounts that the player would have won with his original wagers. The manipulated wagers and the "free money" won may be part of any game where the player's winnings are related to, or derived from, his wagers, including a basic game and a bonus game. Such an arrangement may increase the overall excitement felt by the player and may encourage the player to wager more. Moreover, since only some wagers will result in a winning outcome, it is statistically possible to perform the wager manipulations without significantly changing the underlying mathematics of the game.

FIG. 1 shows a perspective view of an exemplary wagering game terminal 100 according to embodiments of the invention. The wagering game terminal 100 may be operated as a stand-alone terminal, or it may be connected to a network of wagering game terminals. Further, the wagering game terminal 100 may be any type of wagering game terminal and may have varying structures and methods of operation. For example, the wagering game terminal 100 may be a mechanical wagering game terminal configured to play mechanical slots, or it may be an electromechanical or electrical wagering game terminal configured to play a video casino game, such as blackjack, slots, keno, poker, etc. In the example shown, the wagering game terminal 100 is a video slot machine.

As shown, the wagering game terminal 100 includes input devices, such as a wager acceptor 102 (shown as a card wager acceptor 102*a* and a cash wager accepter 102*b*), a touch screen 104, a push-button panel 106, a payout mechanism 108, and an information reader 110. The wagering game terminal 100 further includes a main display 112 for displaying information about the basic wagering game and, in some embodiments, a secondary display 114 for displaying a pay table and/or game-related information or other entertainment features. While these typical components found in the wagering game terminal 100 are described briefly below, it should be understood that numerous other elements may exist and may be used in any number of combinations to create variation of the wagering game terminal 100.

The wager acceptors 102*a* and 102*b* may be provided in many forms, individually or in combination. For example, the cash wager acceptor 102*a* may include a coin slot acceptor or a note acceptor to input value to the wagering game terminal 100. The card wager acceptor 102*b* may include a card-reading device for reading a card that has a recorded monetary value with which it is associated. The card wager acceptor 102*b* may also receive a card that authorizes access to a central account that can transfer money to the wagering game terminal 100.

The payout mechanism 108 performs the reverse function of the wager acceptors 102*a* and 102*b*. For example, the payout mechanism 108 may include a coin dispenser or a note dispenser to dispense money or tokens from the wagering game terminal 100. The payout mechanism 108 may also be adapted to receive a card that authorizes the wagering game terminal 100 to transfer credits from the wagering game terminal 100 to a central account.

The push button panel 106 is typically offered, in addition to the touch screen 104, to provide players with an option on making their game selections. Alternatively, the push button panel 106 may facilitate player input needed for certain aspects of operating the game, while the touch screen 104 facilitates player input needed for other aspects of operating the game.

The outcome of the basic wagering game is displayed to the player on the main display 112. The main display 112 may take a variety of forms, including a cathode ray tube (CRT), a high resolution LCD, a plasma display, LED, or any other type of video display suitable for use in the wagering game terminal 100. As shown here, the main display 112 also includes the touch screen 104 overlaying the entire display (or a portion thereof) to allow players to make game-related selections. Alternatively, the wagering game terminal 100 may include a number of mechanical reels that display the game outcome.

In some embodiments, the information reader 110 is a card reader that allows for identification of a player by reading a card with information indicating the player's identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 110, which allows the casino's computers to register that player's wagering at the wagering game terminal 100. Then, the wagering game terminal 100 may use the secondary display 114 for providing the player with information about his or her account or other player-specific information. Also, in some embodiments, the information reader 110 may be used to restore assets that the player achieved during a previous gaming session and had saved.

Figure 2:
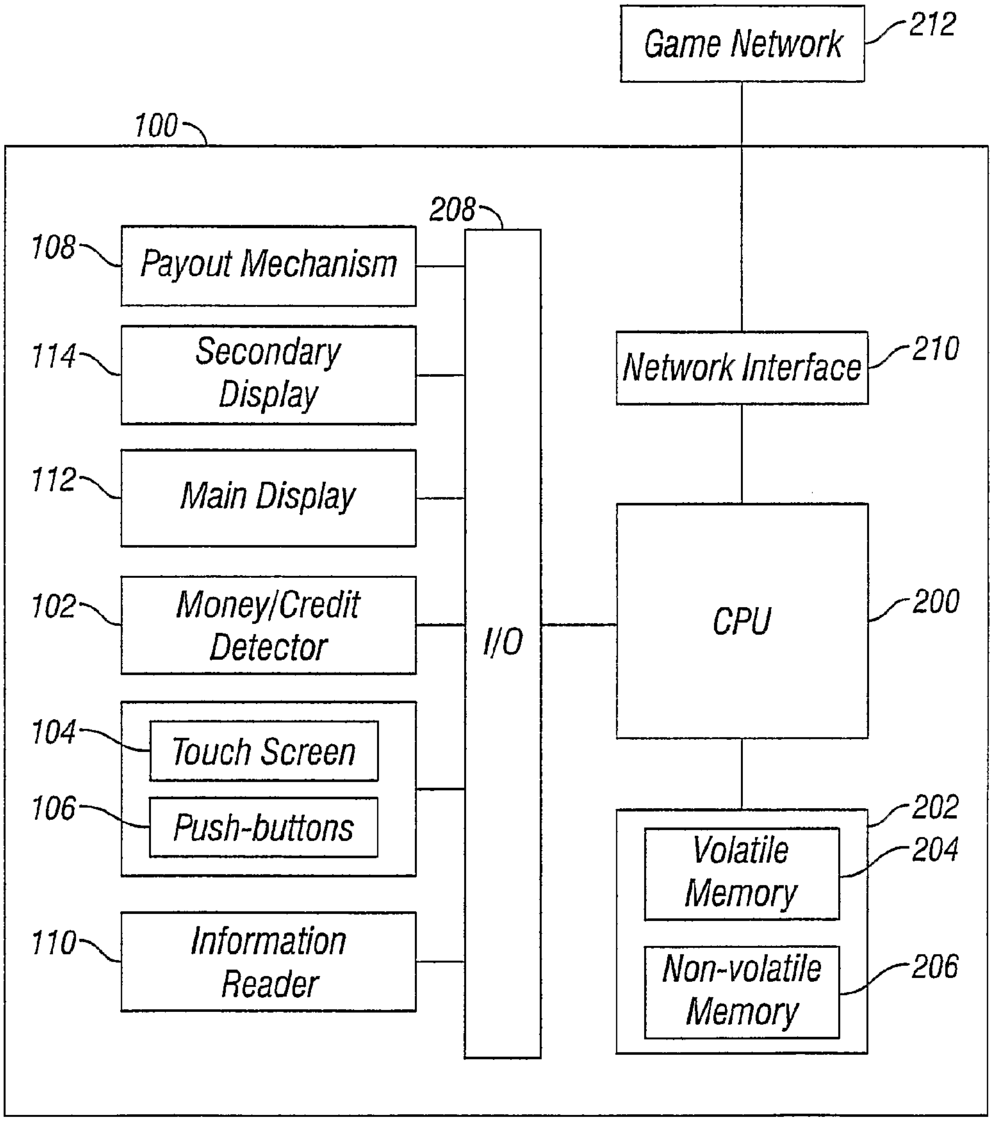
FIG. 2 illustrates the wagering game terminal of FIG. 1 in more detail.

As shown in FIG. 2, the various components of the wagering game terminal 100 are controlled by a central processing unit (CPU) 200, such as one or more microprocessors or microcontrollers. To provide the gaming functions, the CPU 200 executes a game program that generates a randomly selected game outcome. The CPU 200 is also coupled to or includes a local memory 202. The local memory 202 may be in the form of one or more volatile memories 204 (e.g., a random-access memory (RAM)) and one or more non-volatile memories 206 (e.g., an EEPROM).

Communication between the peripheral components of the wagering game terminal 100 and the CPU 200 is controlled by the CPU 200 through input/output (I/O) circuits 208. The CPU 200 also communicates with external systems via a network interface unit 210. Although the I/O circuit 208 and network interface unit 210 are shown here as individual components, it should be appreciated that both of these units may include a number of different types of components.

The network interface unit 210 connects the wagering game terminal 100 to a network 212 that includes several wagering game terminals. The wagering game terminals on the network 212 may be the same wagering terminal or they may be different wagering terminals. That is, they may have the same basic and bonus game or they may have different basic and bonus games. In some embodiments, the wagering game network 212 may control one or more functions of the wagering game terminal 100. In such embodiments, the wagering game terminal 100 may be a simple input/output terminal with regard to the functions provided by the wagering game network 212. For example, the random selection of outcomes for the basic game and the bonus game may be functions performed on the wagering game network 212 and subsequently provided to the wagering game terminal 100. Functions that are not provided by the wagering game network 212, such as control of the local lights, sounds, and the images on the display 112 of the wagering game terminal 100, are handled by the local CPU 200.

Figure 3:
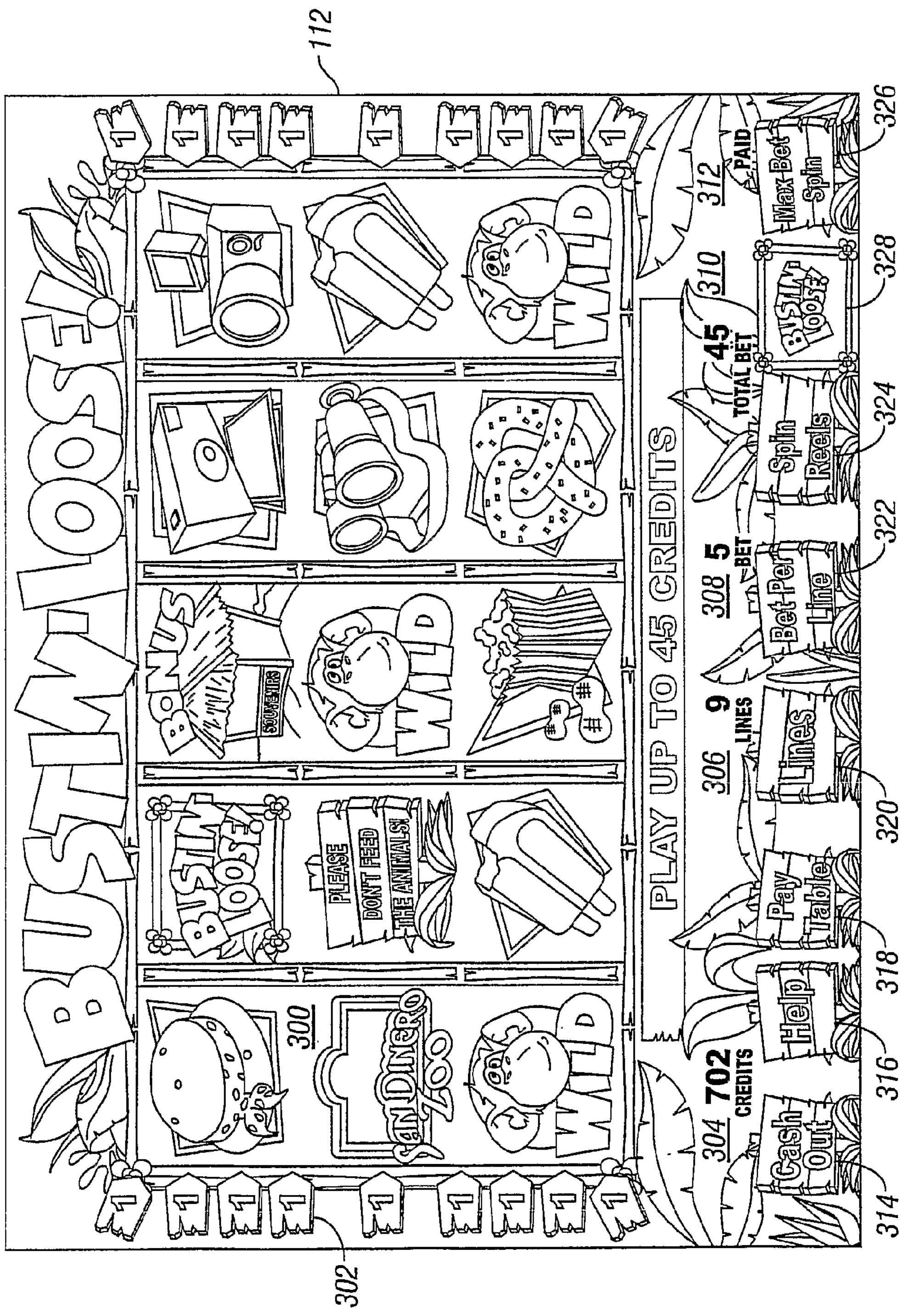
FIG. 3 illustrates an exemplary wagering game that may be played on the wagering game terminal of FIG. 1.

FIG. 3 illustrates an exemplary implementation of a wagering game that may be displayed on the main display 112 of the wagering game terminal 100. The wagering game, which may be a basic game or a bonus game, includes a plurality of main reels 300 for generating a randomly selected outcome. The outcome is a winning outcome when the reels 300 result in some predetermined payline (e.g., three matching symbols in a row). Payline indicators 302 indicate which of several possible paylines are currently being played and the wager multiplier applied to those paylines. Here, a wager multiplier of "1" indicates that the player is playing his wager straight up for that payline, whereas a wager multiplier of "2" for any payline means that he has doubled his wager for that payline. An information area displays various items of information about the wagering game, such as the current credit balance 304, number of lines being played 306, wager per line 308, total wager 310, and the amount paid 312. A plurality of touchscreen buttons 104 allow the player to access various functions in the wagering game, including a cash out button 314, a help button 316, a pay table button 318, line selection button 320, wager selection button 322, a spin button 324, and a max spin button 326. These functions are well-known to persons having ordinary skill in the wagering game art and will therefore not be described in detail here.

In accordance with embodiments of the invention, the wagering game further includes a feature for manipulating a player's wagers. The wager manipulation feature allows the wagering game terminal 100 to add (e.g., double) to the player's wagers instead of his winnings, thereby giving the player a feeling of having received free money even before the wagering game has started. The wager manipulations may be implemented in numerous ways, both with and without player intervention. For example, in one embodiment, the wager manipulation feature may be in the form of random contributions to the wagers independent of the player. In another embodiment, it may be implemented by scheduling "happy hour" periods, again independently of the player, during which all wagers automatically receive contributions for a predetermined amount of time. In still another embodiment, it may be implemented by contributing to the player's wager only after his cumulative wagers exceed a certain threshold amount for a given session of the wagering game.

In the example shown in FIG. 3, the wager manipulation feature is implemented in the form of a mini game within the wagering game. The outcome of the mini game then determines whether a contribution is made to the player's wager. The mini game in this example is a slot-type game having a miniature reel 328 that is activated by a touchscreen button overlaying the reel 328. The miniature reel 328 has a plurality of symbols, including at least one wager manipulation symbol, such as a "Double Your Bet," that causes the wagering game terminal 100 to add a predetermined amount to the player's original wager.

Figure 4A:
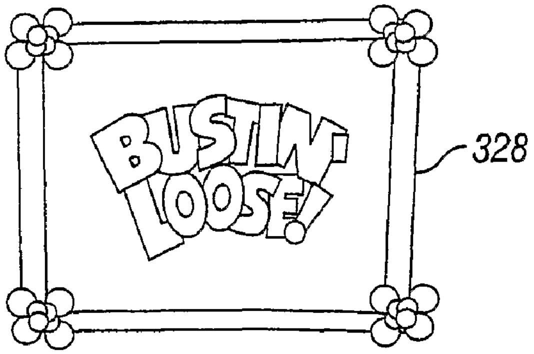
FIGS. 4A-C illustrate an exemplary reel that may be used to determine whether a contribution will be made to a player's wager according to one embodiment of the invention.
Figure 4B:
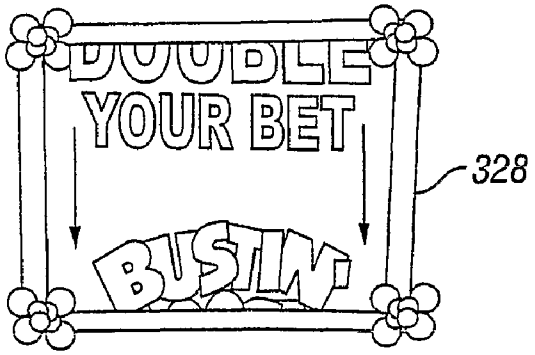
Figure 4C:
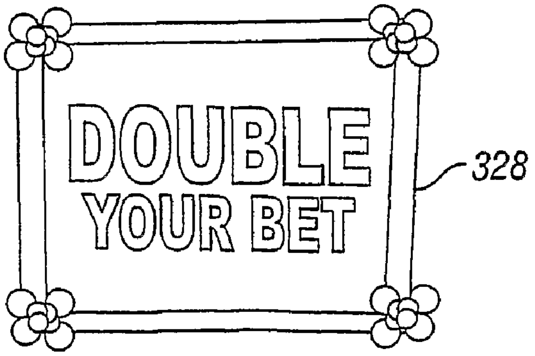
Figure 5:
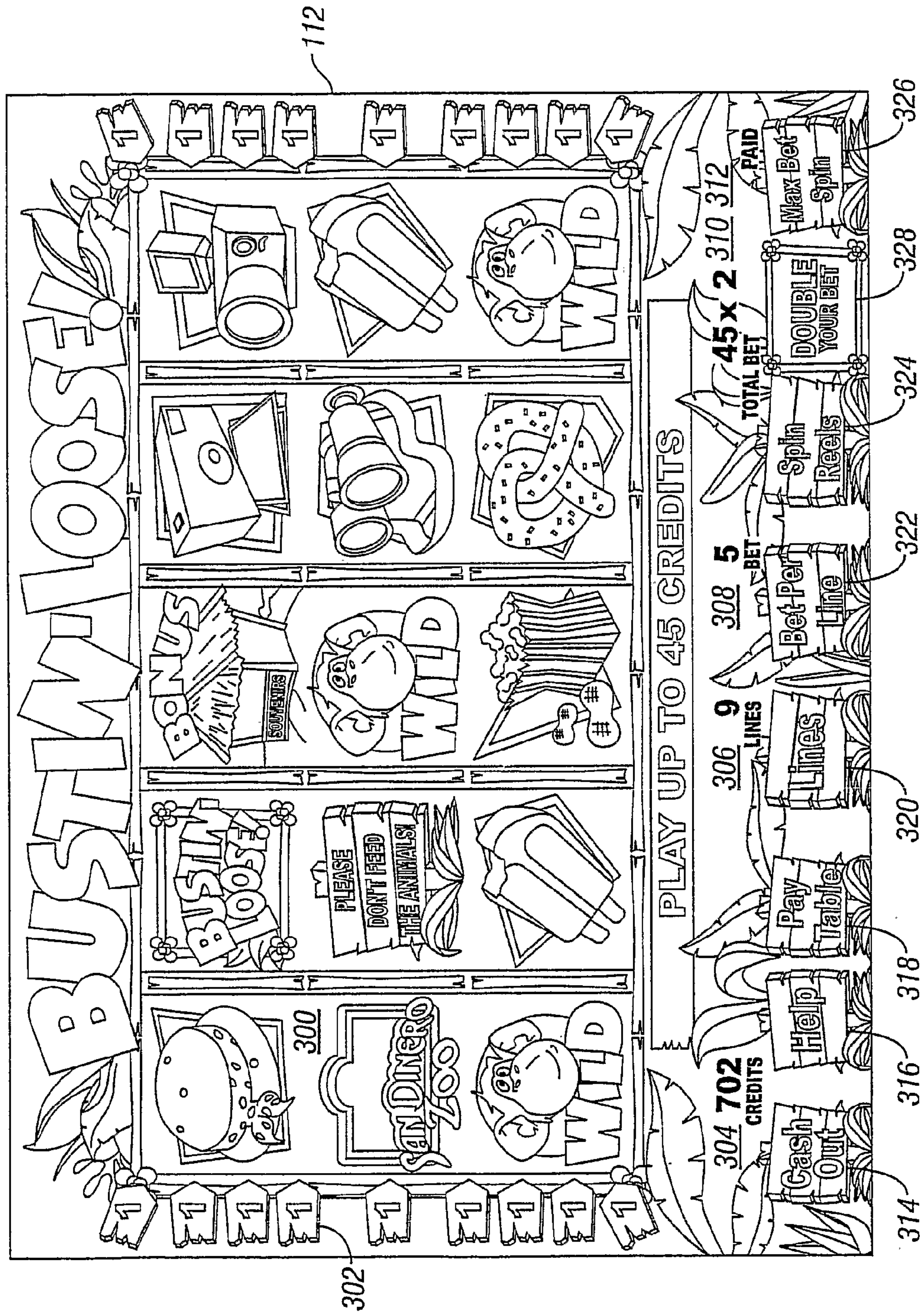
FIG. 5 illustrates the exemplary wagering game of FIG. 3 after a contribution has been made to the player's wager according to one embodiment of the invention.

In operation, at the beginning of a round of the wagering game and before spinning the main reels 300, the player may activate the miniature reel 328. A close-up view of the miniature reel 328 is illustrated in FIGS. 4A-C, where the reel 328 is shown spinning through various symbols and eventually stopping at the "Double Your Bet" symbol. When the miniature reel 328 lands on this symbol, the wagering game terminal 100 contributes to the player's wager an amount equal to the player's original wager for that round. This can be seen in FIG. 5, where the payline indicators 302 indicate that the player is still playing the various paylines straight up, but the total wager information area 310 now shows that the player's total wager has been doubled. In other words, the player stands to win up to twice the amount that he has at risk, depending on the particular wagering game being played.

Other symbols may also be used in other embodiments to manipulate the player's wagers. For example, some symbols may result in contributions of only half the original wager, twice the original wager, an undisclosed amount that is revealed only upon occurrence of a winning outcome, or no contributions, and so forth. Some symbols may result in contributions where the exact amounts may be higher or lower depending on the specific symbol/symbol combination in the winning outcome. There may be some contributions that apply only to the wagers for a certain payline or group of paylines, which payline or group of paylines may be randomly selected by the wagering game terminal 100 or manually selected by the player. Other contributions may apply only to wagers above or below a certain amount, to a subsequent round instead of the current round, and so on.

In addition, in some embodiments, instead of the miniature reel 328 triggering the wager manipulations, other games of chance known to those having ordinary skill in the art may be used. For example, in place of (or in addition to) the miniature reel 328, the wager manipulations may be triggered by a predetermined outcome on the main reels 300. Such a predetermined outcome may result in a wager manipulation for the current game, or it may result in a wager manipulation for one or more subsequent games. The outcome that triggers the wager manipulation may be a basic game outcome or it may be a bonus game outcome. Further, a basic game outcome may trigger a wager manipulation in the bonus game, and a bonus game outcome may trigger a wager manipulation in the basic game.

Where the miniature reel 328 is used, it is possible to employ a regular push button instead of a touchscreen button. Alternatively, instead of the player manually activating the reel, the miniature reel 328 may be activated randomly by the wagering game terminal 100 independently of the player.

It is also possible to implement wager manipulation in conjunction with other game concepts involving wagers. One such game concept is a max bet adder where, if the player wagers the maximum amount, he is awarded a bonus in addition to his regular winnings. For example, in a wagering game where the maximum wager is three credits, a certain winning outcome (e.g., three "7" symbols in a row) may pay 100 credits on a wager of one credit, 200 credits on a wager of two credits, but 350 credits on a wager of three credits (300 credits plus a max bet adder of 50 credits). In such a wagering game, wager manipulation according to embodiments of the invention may be used to maximize the player's wager so that it qualifies for the max bet adder should a winning outcome occur.

Another game concept, called Buy-A-Pay, turns certain non-winning outcomes into winning outcomes when the player wagers at least a predetermined number of credits. For example, an outcome of three "7" symbols in a row is a winning outcome only if the player wagers at least three credits, either on certain a payline or on all paylines. Wager manipulation may therefore be used to qualify the player's wager for the additional winning outcomes.

Moreover, because only a few wagers will actually result in a winning outcome, it is statistically possible to perform the wager manipulations without major modifications to the mathematics of the wagering game terminal 100. In fact, the same funding scheme used in wagering game terminals that manipulate winnings may instead be used to fund wager manipulations, provided the payback percentage (i.e., the ratio of the amount paid out to the amount taken in over time) is approximately the same. Where no funding scheme is in place, the wager manipulations may be funded by siphoning a certain percentage of the coin-in received for the wagering game terminal 100 and collecting these amounts in a hidden pool. It is also possible to fund the wager manipulations by collecting from several wagering game terminals 100 connected together over a network (e.g., the network 212 of FIG. 2) in a manner similar to the scheme used in a progressive jackpot. Indeed, funding for the wager manipulations may be implemented by simply siphoning a certain portion of the progressive jackpot.

An advantage of the above embodiments is that for a given pool, it may be statistically possible to perform the wager manipulations more frequently than the winnings manipulation. Alternatively, in some implementations, the mathematics may be modified to produce fewer occurrences of winning outcomes so that the payback percentage may be maintained about the same. In this way, the existing pool used to fund winning outcomes from regular (unmanipulated) wagers may also be used to fund the wager manipulations. Such mathematical alterations are well-known to persons having ordinary skill in the art and need not be described here.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A wagering game terminal comprising:

a wager input for accepting a wager for a wagering game from a player at said wagering game terminal; and a display for displaying a first outcome of said wagering game, said first outcome being randomly selected from a plurality of first outcomes;

said display further displaying a mini game within said wagering game, said mini game comprising a miniature reel having a plurality of symbols including a wager contribution symbol, said mini game indicating a second outcome randomly selected from a plurality of second outcomes by spinning said mini reel to display a symbol, wherein said wagering game terminal is configured to increase said wager for said wagering game based on said second outcome of said mini game, said wager being increased without requiring additional funds from said player.

2. A wagering game terminal comprising:

a wager input for accepting a wager for a wagering game from a player at said wagering game terminal; and a display for displaying a first outcome of said wagering game, said first outcome being randomly selected from a plurality of first outcomes, said display further displaying a mini game within said wagering game, said mini game comprising a miniature reel having a plurality of symbols including a wager contribution symbol, said miniature reel, when activated, spinning to display a symbol indicating a second outcome randomly selected from a plurality of second outcomes, said miniature reel being activated by one of said player and said wagering game terminal independently of said player, and wherein said wagering game terminal is configured to increase said wager for said wagering game based on said second outcome of said mini game, said wager being increased without requiring additional funds from said player.

3. A method of manipulating wagers in a wagering game terminal, the method comprising:

accepting a wager, via an input device, for a wagering game at said wagering game terminal, said wagering game including randomly selecting and displaying an outcome, via a display, from a plurality of outcomes, said plurality of outcomes including at least one winning outcome;

siphoning a portion of said wager and contributing said portion to a pool of funds;

increasing said wager by turning at least one of said plurality of outcomes from a non-winning outcome to a winning outcome, said increased wager funded by said wagering game terminal from said pool of funds;

conducting said wagering game by randomly selecting an outcome from the plurality of outcomes; and awarding said player an award commensurate with said increased wager if said randomly selected outcome is one of said winning outcomes.

* * * * *